United States Patent [19]

Albin

[11] Patent Number: 5,509,765
[45] Date of Patent: Apr. 23, 1996

[54] REMOVABLE MOLLY BOLT

[76] Inventor: Stephen D. Albin, 610 Rancho, Los Altos, Calif. 94024

[21] Appl. No.: 289,917

[22] Filed: Aug. 12, 1994

[51] Int. Cl.⁶ .............................. F16B 13/04; F16B 13/06
[52] U.S. Cl. ................... 441/38; 411/55; 411/344
[58] Field of Search .................. 411/34–38, 55, 411/340, 344, 345; 29/525.1

[56] References Cited

U.S. PATENT DOCUMENTS

| | | | |
|---|---|---|---|
| 2,491,742 | 12/1949 | Lein | 411/38 X |
| 3,888,156 | 6/1975 | Fima | 411/38 |
| 3,942,407 | 3/1976 | Mortensen | 411/36 |
| 4,152,968 | 5/1979 | Lassine | 411/38 |
| 4,422,813 | 12/1983 | Greenbaum | 411/38 |
| 5,044,849 | 9/1991 | Starke | 411/38 |

*Primary Examiner*—Neil R. Wilson
*Attorney, Agent, or Firm*—Hickman Beyer & Weaver

[57] ABSTRACT

A removable hollow-wall anchor for fastening machine screws to a wall is disclosed. Commonly called a Molly bolt, in one aspect of the invention the head of the Molly bolt is unthreadable from the anchor part of the Molly bolt so that once the Molly bolt has been secured to the wall the head can be unthreaded so as to remove it from the outer surface of the wall. A gripper is used in conjunction with the head to prevent rotation of the Molly bolt when the machine screw is being threaded in or out. The gripper is also removable from the wall. Once the machine screw, head and gripper have been removed from the wall, the outer surface of the wall is flush and free from any part of the Molly bolt.

31 Claims, 2 Drawing Sheets

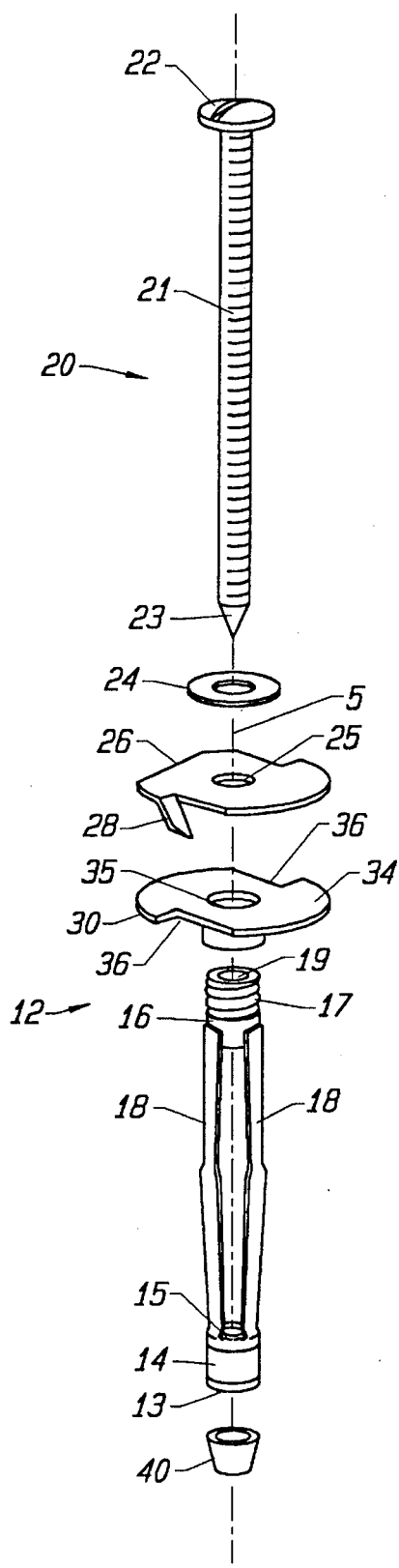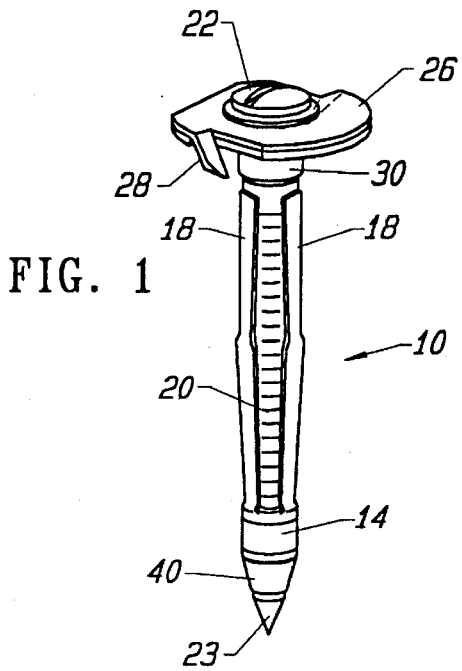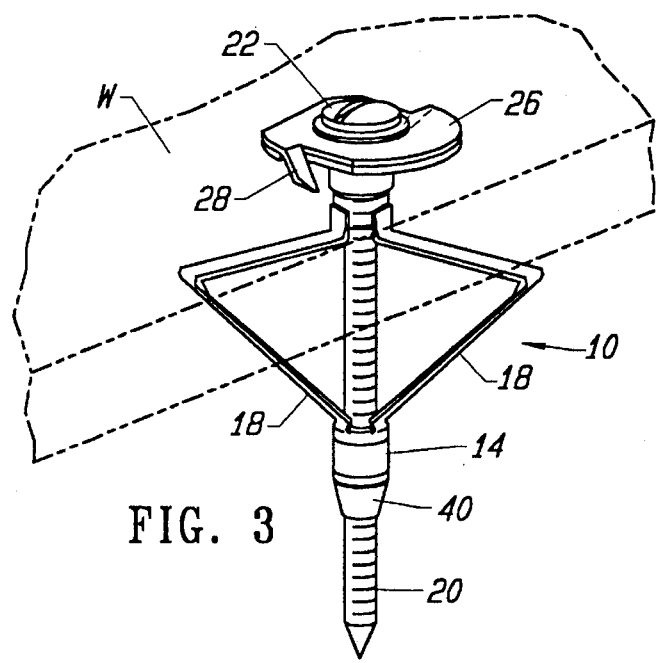

REMOVABLE MOLLY BOLT

BACKGROUND OF THE INVENTION

The present invention relates generally to wall fasteners of the type generally referred to as Molly bolts that are used on dry wall and the like. More particularly, a removable hollow-wall anchor having a detachable head is described.

Hollow-wall anchors (or Molly bolts) are typically used in dry wall such as sheet rock. Molly bolts are used where screws or nails will not work, for example in sheet rock where there is no solid surface for the screw or nail to bite into. Once the Molly bolt is affixed to the wall, objects can then be attached to the outside surface of the wall using the Molly bolt. A screw, nail, or bolt by itself would not hold in dry wall.

A Molly bolt is composed of two separate parts, an anchor and a machine screw. The anchor incorporates the threads, a number of deformable legs (usually three or four) and a head. The head functions much like the head of a nail to prevent the Molly bolt from entering the wall; it also has tangs which enter the wall and prevent the anchor from rotating when the machine screw is threaded in.

A Molly bolt comes with the machine screw already threaded into and fully inserted into the anchor. Once the Molly bolt is hammered into the dry wall, the screw is turned as if to thread it into the anchor. However, as the screw is already fully inserted into the anchor, the threaded portion of the anchor is pulled towards the wall, thus deforming the legs and pressing them up against the inside of the wall. The anchor of the Molly bolt is thus permanently secured to the wall. The screw can then be removed and reinserted to hold an object to the wall.

It should be apparent that it is critical to the operation of the Molly bolt that the anchor not rotate while the screw is turned. If the anchor were to turn, the legs would not be pulled up against the inside of the wall. Thus, the tangs on the head of the Molly bolt serve the important function of digging into the wall and preventing the rotation of the anchor.

One disadvantage of the Molly bolt is that it is permanently fixed to the wall. Once the tangs of the head dig into the outer surface of the wall and the deformed legs press tight against the inner surface of the wall, the anchor is permanently in place. As the anchor is all one piece, the wall must be partially destroyed in order to remove the Molly bolt.

Considering the above disadvantages of traditional Molly bolts, a Molly bolt that is removable from a wall once affixed would be desirable.

SUMMARY OF THE INVENTION

To achieve the foregoing and other objects and in accordance with the purpose of the present invention, a removable hollow-wall anchor (Molly bolt) is described. This removable hollow-wall anchor is referred to hereafter as a fastener. The fastener consists of an anchor into which a machine screw is threaded. Typically, the screw is threaded into the anchor before the fastener is inserted into the wall. The anchor has an inner portion incorporating the threads for the screw, an outer portion and one or more legs that join the inner portion to the outer portion.

The screw also passes through a gripper and a removable flange. The removable flange is mounted on the outer portion of the anchor. The gripper is located next to the flange and has means not only for anchoring itself to the wall, but also for holding the flange in place and preventing it from rotating. By preventing the flange from rotating, the gripper also prevents the anchor from rotating when the screw is threaded in or out.

To secure the fastener to the wall, first the fastener is driven into the wall until the flange abuts the outer surface of the wall. Next the screw is threaded in causing the legs to deform and pull up against the inner surface of the wall. In this position the fastener is ready for use. The screw may be removed and reinserted with an object to mount on the wall.

It is after the fastener has been secured to the wall that a novel aspect of the present invention can be fully appreciated. Once secured to the wall, the fastener functions as a traditional Molly bolt yet is fully removable. To remove the fastener, first the screw is removed. Next, the gripper is removed from the wall, and finally the flange is detached from the outer portion of the anchor and removed from the wall. The outer surface of the wall is left flush. The anchor of the fastener is left hanging on the inner surface of the wall or perhaps may fall off.

In one embodiment the flange has a hollow cylindrical shape and fits over the outer portion of the anchor. The outer portion is threaded on the outside and the flange is threaded on the inside to mate with the outer portion. In another embodiment the outer portion is threaded on the inside and the flange is threaded on the outside to mate with the outer portion.

A further embodiment contemplates a gripper that is located on the screw in between the flange and the screw head. In this embodiment the flange has openings or slots cut out of its top surface. The gripper has tangs which extend down through the openings in the flange in order to engage the wall. In this fashion the tangs will not only dig into the wall but will also prevent the rotation of the flange, which in turn prevents rotation of the anchor.

Another embodiment contemplates a gripper that is located on the screw in between the outer surface of the wall and the flange. In this embodiment the flange also has openings or slots cut out of its top surface. The gripper again has tangs which extend towards the wall in order to engage the wall. The gripper also has tangs which extend in the opposite direction through the openings in the flange in order to likewise prevent the rotation of the flange, which in turn prevents rotation of the anchor.

Another embodiment uses the same cylindrical flange, yet without threads. In this embodiment the flange slides over the outer portion of the anchor. The outer portion may have raised ridges which slide into corresponding slots on the inside of the flange. Vice-versa, the flange may have raised ridges on its inner surface which slide into corresponding slots on the outside of the outer portion. For this embodiment the flange has raised fins running along its surface. These raised fins run parallel to the screw. When the fastener is hammered into a wall, these raised fins will engage the inside of the wall and prevent the rotation of the flange, which in turn prevents rotation of the anchor.

Other features and advantages of the present invention are stated in or apparent from the detailed description of various embodiments of the present invention as described below.

BRIEF DESCRIPTION OF THE DRAWINGS

The invention, together with further objects and advantages thereof, may best be understood by reference to the following description taken in conjunction with the accompanying drawings in which:

FIG. 1 is a perspective view of a removable dry wall fastener in its insertion position in accordance with one embodiment of the present invention.

FIG. 2 is an exploded perspective view of the fastener illustrated in FIG. 1.

FIG. 3 is a perspective view of the fastener shown in FIG. 1 in its anchoring position within a wall.

DETAILED DESCRIPTION OF THE INVENTION

Figure 4:
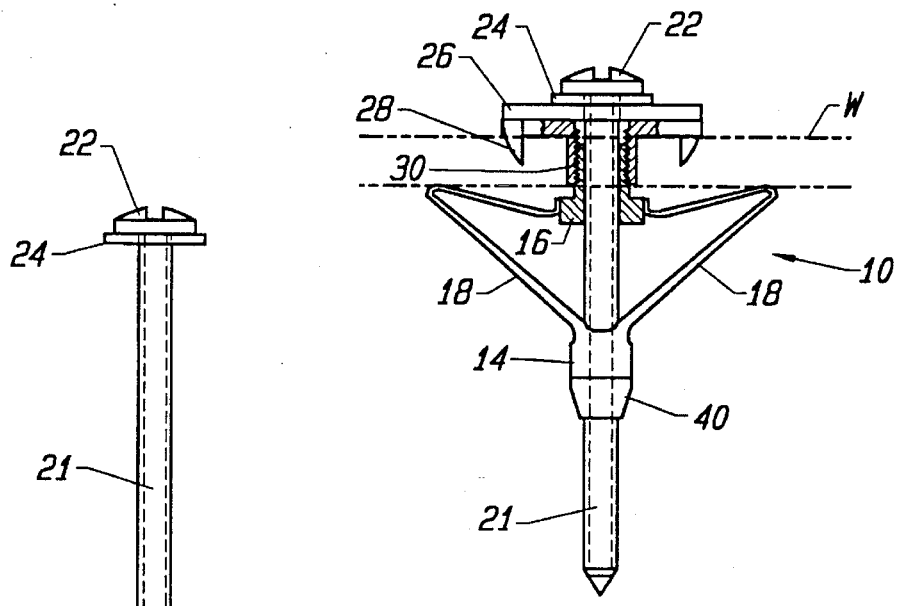
FIG. 4 is an elevation view of the fastener depicted in FIG. 3.

Referring initially to FIGS. 1–3, a removable dry wall fastener 10 in accordance with the present invention is shown. The fastener 10 includes generally a machine screw 20 and an anchor 12. The anchor consists of an inner portion 14 connected to an outer portion 16 by one or more deformable legs 18. The anchor 12 also consists of a flange 30, a gripper 26 and a washer 24.

The machine screw 20 has a threaded shaft 21 and a head 22, the diameter of the head being larger than the diameter of the threaded shaft. The screw 20 is threaded, so that it can be threaded into the anchor 12. The screw has a tip 23 which may be blunt or pointed. A blunt tip is more often used when there is a pre-existing hole in a wall. A pointed tip can be used when the fastener must be driven through the dry wall with a hammer, for example. A cap 40 is a plastic, hollow, tapered piece which is also used with a pointed tip 23 to facilitate the entry of the fastener 10 into a wall.

The inner portion 14 of the anchor 12 has internal threads 15 in order to mate with the threaded shaft 21 of the machine screw 20. The inner portion 14 also has an inner aperture 13 with a corresponding diameter. When fully inserted, the screw 20 is threaded into the inner portion 14 and extends through it. Deformable legs 18 connect the inner portion 14 to the outer portion 16. The fastener will typically have three or four legs, although it is contemplated that a fastener could have more legs, or even two or one. The legs are substantially elongated strips, being slightly curved inward along their length.

The outer portion 16 of the anchor 12 has outer portion threads 17 in order to mate with the flange 30. The outer portion 16 also has an outer aperture 19 with a corresponding diameter. The outer aperture 19 is large enough such that when the screw 20 is inserted into the anchor 12, the screw does not engage the sides of the outer aperture. The length of the outer portion 16 preferably corresponds to the width of wall to which the fastener 10 is attached. That is, the length of the outer portion 16 should be substantially the same as the width of the wall for best operation of the fastener.

The flange 30 is formed of a nut 32 and a planar surface 34 which has openings, slots or notches 36 cut out of it to receive tangs 28. The nut 32 is substantially of a hollow, cylindrical shape having internal flange threads. The flange threads are such that they mate with the outer portion threads 17 and allow the flange 30 to be threaded on or off of the outer portion 16. I have found that conventional threads allowing the flange 30 to be threaded on clockwise work well, although it is contemplated that reverse threads allowing the flange to be threaded on counter-clockwise would also work. The flange 30 also has a flange aperture 35 which is large enough to allow the flange to fit over the outer portion 16.

The gripper 26 has one or more tangs 28 which engage the flange 30 by fitting into the notches 36 of the flange. The gripper 26 is substantially flat and round in shape, although it could be of any geometry. The tangs 28 may be bent perpendicular to the plane of the gripper 26 or at an angle. The gripper 26 also has a gripper aperture 25 which is large enough to allow passage of the screw 20 without engaging it. A washer 24 can also be used between the gripper 26 and the head 22 of the screw to help prevent the rotation of the head 22 from imparting motion to the gripper.

FIG. 1 shows the fastener 10 with the screw 20 already fully inserted into the anchor 12. FIG. 2 shows in more detail how the fastener may be assembled. The flange 30 can be threaded onto the outer portion 16. The screw passes through the washer 24, the gripper 26, the flange 30 and through the outer portion 16 until the screw threads meet the internal threads 15 of the inner portion 14. The screw 20 can then be threaded into the inner portion 14 until the screw is fully inserted into the anchor 12. In this position, the fastener 10 is ready for insertion into a wall. Alternatively, it is also possible for the anchor 12 to be inserted into the wall without the screw 20. The screw 20 can be threaded into the anchor 12 while the anchor is in a wall.

To insert the fastener 10 as shown in FIG. 1 into a wall W, the tip 23 of the fastener is first placed against the wall W. The fastener is then driven into the wall W by preferably hitting the head 22 with a hammer. The fastener is fully driven into the wall until the flange 30 is firmly pressed against the outer surface of the wall W. In this position, the tangs 28 of the gripper 26 will also be driven into the wall W. With the tangs 28 digging into the wall, the anchor 12 is prevented from rotating. The gripper 26 cannot rotate because the tangs 28 are digging into the wall. The flange 30 cannot rotate because the tangs 28 extend through the notches 36 in the flange 30. Likewise, the anchor 12 is prevented from rotating because the flange 30 is threaded onto the outer portion 16. The fastener 10 can then be deformed into its anchoring position.

To deform the fastener into its anchoring position, the machine screw 20 is rotated in a clockwise direction so that the threads of the machine screw 20 engage the threaded inner portion 14 and pull the inner portion and legs 18 to the inner surface of the wall W. The inner portion 14 of the anchor 12 is pulled towards the wall because the machine screw 20 is fixed in relation to the wall W. The deformable legs 18 are common to all hollow-wall anchors and are well known to those skilled in the art. The legs 18 will deform and press firmly against the inner surface of the wall W, thus holding the fastener 10 firmly in place. FIG. 3 shows the fastener 10 as the legs 18 are being brought to bear against the inner surface of the wall W. Of course, reverse threads can also be used on the machine screw 20 and inner portion 14 in which case the fastener would function exactly as above except that the machine screw 20 would be rotated in a counter-clockwise direction in order to deform the legs.

FIG. 4 is an elevation view of the fastener 10 in its anchoring position in the wall W. The machine screw 20 passes through the washer 24, the gripper 26, the flange 30 and into the anchor 12. The tangs 28 of the gripper 26 have dug into the wall W. The flange 30 is partially in the wall W, and the legs 18 are firmly pressing up against the inner surface of the wall. In this anchoring position, the machine screw 20 can be removed and then reinserted to hold an object to the wall. Once the screw 20 is removed, the anchor 12 remains firmly held to the wall W by the flange 30 and the legs 18.

Figure 5:
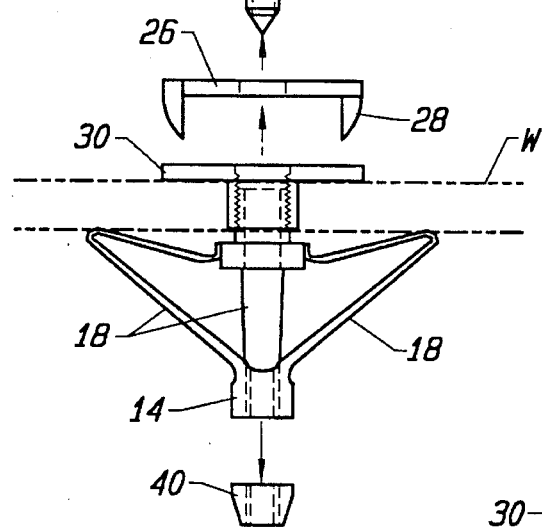
FIG. 5 is an elevation view of the fastener shown in FIG. 4 being removed from the wall with the flange still in place.
Figure 6:
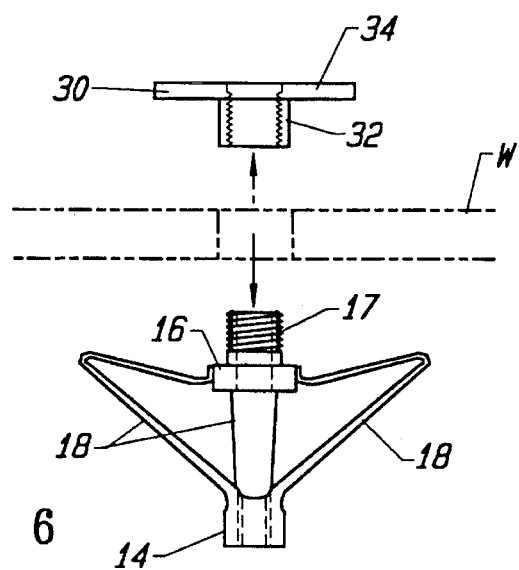
FIG. 6 is an elevation view of the fastener shown in FIG. 5 being removed from the wall with the flange coming off.

FIG. 5 demonstrates how the fastener 10 can be removed from the wall W. First the machine screw 20 and washer 24 are removed. The anchor 12 will not rotate as the screw is being removed because the tangs 28 are digging into the wall. Next, the gripper 26 can be pried off of the wall W. Finally, as shown in FIG. 6, the flange 30 can be unthreaded from the outer portion 16 and removed from the wall W. The anchor 12 will fall off of the 15 wall or perhaps will remain stuck to the inner surface of the wall. The cap 40 will have fallen off when the machine screw 20 is first removed. The outer surface of the wall is left flush. It should be appreciated that the flange and gripper are two separate pieces to prevent damage to the wall. In traditional Molly bolts, the tangs of the gripper and flange where both incorporated into the head of the Molly bolt. However, in an embodiment of the present invention, the tangs must be formed on the separate gripper, because if the tangs were part of the flange, the tangs would tear up the wall as the flange was unthreaded from the anchor.

In another embodiment, referring back to FIG. 5, the gripper 26 could be mounted on the machine screw 20 in between the flange 30 and the outer surface of the wall W. In this embodiment the fastener is removed from the wall W by first removing the machine screw 20 and washer 24, then by unthreading the flange 30 from the outer portion 16 and finally by prying the gripper 26 from the wall W.

In yet another embodiment, the flange 30 does not thread onto the outer portion 16, but slides over it. The outer portion 16 has raised ridges that run parallel to the machine screw 20. The inside of the flange 30 has slots that slide over the raised ridges and mate the flange 30 with the outer portion 16. In this embodiment the flange 30 also has raised fins on the outside of the nut 32 that will engage the inside of the wall W and prevent the flange 30 and anchor 12 from rotating. In this embodiment the gripper 26 is not needed. Of course, alternatively, the inside of the flange 30 could have the raised ridges that mate with slots on the outer portion 16.

Although only a few embodiments of the present invention have been described in detail, it should be understood that the present invention may be embodied in many other specific forms without departing from the spirit or scope of the invention. Particularly, the flange may be removably attached to the outer portion by some other method than by threading it on, for example, by sliding the flange over the outer portion. Or for example, the outer portion may slide into the flange, and the outer portion would have a number of small protrusions (preferably two) that would engage the flange. Each protrusion would slide into a groove or recess on the inside surface of the flange, or could even protrude through the flange. These protrusions would prevent the flange from rotating. Alternatively, the flange would have the protrusions, and the outer portion would have the grooves. Also, the outer portion may have internal threads and the flange would have external threads to mate with those of the outer portion.

Additionally, the gripper may prevent rotation of the flange by modified tangs. Some tangs may extend through the flange into the wall, while others may simply extend into the flange only to prevent its rotation. Also, a wood screw, sheet metal screw, bolt or other threaded shaft could be used to thread into the fastener instead of a machine screw. Therefore, the present examples are to be considered as illustrative and not restrictive, and the invention is not to be limited to the details given herein, but may be modified within the scope of the appended claims.

I claim:

1. A hollow-wall anchor comprising:

an inner portion provided with an inner aperture receptive to a threaded shaft of a machine screw;

an outer portion having an outer aperture through which the threaded shaft can extend without engaging the outer aperture, the outer portion having outer portion threads;

a deformable leg coupling the inner portion to the outer portion; and a flange removably attached to the outer portion, the flange including a surface having a flange aperture through which the threaded shaft can extend without engaging the flange aperture, and the flange having flange threads engagable with the outer portion threads.

2. A hollow-wall anchor as recited in claim 1 wherein the flange includes a planar surface.

3. A hollow-wall anchor as recited in claim 2 wherein the planar surface of the flange is substantially disk-shaped having a diameter greater than a diameter of the threaded shaft.

4. A hollow-wall anchor as recited in claim 1 wherein the flange includes a nut affixed to the surface in alignment with the flange aperture, the nut defining the flange threads, and wherein the outer portion threads are provided around the outer portion to engage the flange threads of the nut.

5. A hollow-wall anchor comprising:

an inner portion provided with an inner aperture receptive to a threaded shaft of a machine screw;

an outer portion having an outer aperture through which the threaded shaft can extend without engaging the outer aperture;

a deformable leg coupling the inner portion to the outer portion;

a flange removably attached to the outer portion, the flange including a surface having a flange aperture through which the threaded shaft can extend without engaging the flange aperture; and a gripper having a tang, the gripper being engagable with the surface of the flange with the tang projecting towards the inner portion.

6. A hollow-wall anchor as recited in claim 5 wherein the tang comprises a pointed projection bent from a plane of the gripper.

7. A hollow-wall anchor as recited in claim 6 wherein the gripper is provided with a gripper aperture through which the threaded shaft can extend without engaging the gripper aperture.

8. A hollow-wall anchor as recited in claim 7 wherein the gripper abuts the surface of the flange.

9. A hollow-wall anchor as recited in claim 8 wherein the gripper and the surface of the flange define an anchor axis, and wherein the gripper and the surface are rotationally coupled together relative to the anchor axis.

10. A hollow-wall anchor as recited in claim 9 wherein the surface of the flange is positioned between the outer portion and the gripper, and is further provided with a tang aperture receptive to the tang such that the gripper and the surface are rotationally coupled together relative to the anchor axis.

11. A hollow-wall anchor as recited in claim 10 wherein the tang is one of a plurality of tangs, and wherein the tang aperture is one of a plurality of tang apertures receptive to the plurality of tangs.

12. A hollow-wall anchor as recited in claim 11 wherein the deformable leg is one of a plurality of deformable legs coupling the inner portion to the outer portion.

13. A hollow-wall anchor comprising:
   an inner portion having an inner aperture with a first internal diameter, the inner aperture having internal threads, the inner aperture being coaxial with an anchor axis;
   an outer portion having an outer aperture with a second internal diameter that is greater than the first internal diameter, the outer aperture being coaxial with the anchor axis;
   a deformable leg coupling the inner portion to the outer portion;
   a removable flange having a centrally located flange aperture having a third internal diameter that is greater than the first internal diameter, the flange being operationally attached to the outer portion with the flange aperture being coaxial with the anchor axis; and
   a gripper having a tang, the gripper being engagable with a surface of the flange with the tang projecting towards the inner portion.

14. A hollow-wall anchor comprising:
   an inner portion having an inner aperture with a first internal diameter, the inner aperture having internal threads, the inner aperture being coaxial with an anchor axis;
   an outer portion having an outer aperture with a second internal diameter that is greater than the first internal diameter, the outer aperture being coaxial with the anchor axis, the outer portion having outer portion threads;
   a deformable leg coupling the inner portion to the outer portion; and
   a removable flange having a centrally located flange aperture having a third internal diameter that is greater than the first internal diameter, the flange having flange threads being engagable with the outer portion threads, the flange aperture being coaxial with the anchor axis.

15. A hollow-wall anchor as recited in claim 14 wherein the flange includes a nut affixed to a planar surface of the flange coaxially with the anchor axis, the nut defining the flange threads, and wherein the outer portion threads are provided around the outer portion to engage the flange threads of the nut.

16. A hollow-wall anchor as recited in claim 15 further comprising a gripper having a tang, the gripper being engagable with the planar surface of the flange with the tang projecting towards the inner portion.

17. A hollow-wall anchor as recited in claim 16 wherein the deformable leg is one of a plurality of deformable legs coupling the inner portion to the outer portion.

18. A hollow-wall anchor as recited in claim 16 wherein the tang comprises a pointed projection bent from a plane of the gripper.

19. A hollow-wall anchor as recited in claim 18 wherein the gripper is provided with a gripper aperture through which the threaded shaft can extend without engaging the gripper aperture, and wherein the gripper abuts the planar surface of the flange and the gripper and planar surface are rotationally coupled together relative to the anchor axis.

20. A hollow-wall anchor as recited in claim 19 wherein the planar surface of the flange is positioned between the outer portion and the gripper, and is further provided with a tang aperture receptive to the tang such that the gripper and the planar surface are rotationally coupled together relative to the anchor axis.

21. A hollow-wall anchor as recited in claim 20 wherein the tang is one of a plurality of tangs, and wherein the tang aperture is one of a plurality of tang apertures receptive to the plurality of tangs.

22. A hollow-wall fastener comprising:
   a machine screw having a head and a threaded shaft extending from the head, the threaded shaft defining an anchor axis and having a shaft diameter and a head diameter, the head diameter being greater than the shaft diameter;
   an anchor engaged with the machine screw, the anchor including:
      (a) an inner portion with an inner aperture having internal threads engagable with the threaded shaft of the machine screw;
      (b) an outer portion with an outer aperture having an internal diameter that is greater than the shaft diameter such that the threaded shaft does not engage the outer aperture;
      (c) a deformable leg coupling the inner portion to the outer portion; and
      (d) a flange having a centrally located aperture that has a diameter greater than the shaft diameter, the flange being removably attached to the outer portion; and
   a gripper having a tang comprising a pointed projection bent from a plane of the gripper, the gripper being engagable with a planar surface of the flange with the tang projecting towards the inner portion.

23. A hollow-wall fastener as recited in claim 22 wherein an end of the threaded shaft distal from the head is a pointed end.

24. A hollow-wall fastener as recited in claim 23 further comprising a conical member having a threaded bore engagable with the threaded shaft and positioned proximate to the pointed end.

25. A hollow-wall fastener as recited in claim 23 wherein the deformable leg is one of a plurality of deformable legs coupling the inner portion to the outer portion.

26. A hollow-wall fastener comprising:
   a machine screw having a head and a threaded shaft extending from the head, the threaded shaft defining an anchor axis and having a shall diameter and a head diameter, the head diameter being greater than the shall diameter; and
   an anchor engaged with the machine screw, the anchor including:
      (a) an inner portion with an inner aperture having internal threads engagable with the threaded shaft of the machine screw;
      (b) an outer portion with an outer aperture having an internal diameter that is greater than the shaft diameter such that the threaded shaft does not engage the outer aperture;
      (c) a deformable leg coupling the inner portion to the outer portion; and
      (d) a flange having a centrally located aperture that has a diameter greater than the shaft diameter, the flange being removably attached to the outer portion, wherein the flange includes a nut affixed to a planar surface of the flange coaxial with the anchor axis to provide flange threads, and wherein the outer portion is provided with outer portion threads to engage the flange threads of the nut.

27. A hollow-wall fastener as recited in claim 26 further comprising a gripper having a tang comprising a pointed projection bent from a plane of the gripper, the gripper being engagable with the planar surface of the flange with the tang projecting towards the inner portion.

28. A hollow-wall fastener as recited in claim 27 wherein the planar surface of the flange is positioned between the outer portion and the gripper, and is further provided with a tang aperture receptive to the tang such that the gripper and the planar surface are rotationally coupled together relative to the anchor axis.

29. A hollow-wall fastener as recited in claim 28 wherein the tang is one of a plurality of tangs, and wherein the tang aperture is one of a plurality of tang apertures receptive to the plurality of tangs.

30. A hollow-wall fastener as recited in claim 29 further comprising a washer mounted on said machine screw.

31. A method for attaching and removing a hollow-wall fastener from a wall, the wall having an inner surface and an outer surface, the fastener comprising an anchor with an inner portion, an outer portion and one or more deformable legs which connect the inner portion to the outer portion, the fastener further comprising a machine screw threaded into the inner portion of the anchor, a flange positioned between the outer surface of the wall and a head of the machine screw, and a gripper positioned between the flange and the machine screw head, the method comprising the steps of:

(a) inserting the fastener through the wall such that the inner portion and deformable legs are inside the wall and the flange abuts the outer surface of the wall;

(b) rotating the machine screw so that the deformable legs deform and are brought to bear firmly against the inner surface of the wall, the anchor being unable to rotate due to the gripper engaging the outer surface of the wall;

(c) unthreading the machine screw from the inner portion and removing it from the wall;

(d) removing the gripper from the outer surface of the wall; and (e) unthreading the flange from the outer portion of the anchor and removing the flange from the outer surface of the wall, thus leaving a flush outer surface of the wall.

* * * * *